United States Patent
Nodomi et al.

(10) Patent No.: US 11,504,661 B2
(45) Date of Patent: Nov. 22, 2022

(54) FILTER DEVICE

(71) Applicant: YAMASHIN-FILTER CORP., Kanagawa (JP)

(72) Inventors: Youichi Nodomi, Kanagawa (JP); Nobuyuki Kitajima, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 359 days.

(21) Appl. No.: 16/807,941

(22) Filed: Mar. 3, 2020

(65) Prior Publication Data

US 2020/0197852 A1    Jun. 25, 2020

Related U.S. Application Data

(63) Continuation of application No. PCT/JP2018/036821, filed on Oct. 2, 2018.

(30) Foreign Application Priority Data

Oct. 6, 2017 (JP) ............................. JP2017-195833

(51) Int. Cl.
*B01D 53/73* (2006.01)
*B01D 36/00* (2006.01)
(Continued)

(52) U.S. Cl.
CPC ........... *B01D 36/001* (2013.01); *B01D 29/21* (2013.01); *B01D 35/18* (2013.01); *B01D 53/73* (2013.01);
(Continued)

(58) Field of Classification Search
CPC ...... B01D 36/001; B01D 29/21; B01D 35/18; B01D 53/73; B01D 53/92;
(Continued)

(56) References Cited

U.S. PATENT DOCUMENTS

| 4,502,955 A | 3/1985 | Schaupp |
| 4,522,712 A | 6/1985 | Fischer et al. |

(Continued)

FOREIGN PATENT DOCUMENTS

| DE | 102012005733 B3 | 4/2013 |
| JP | S60-501049 A | 7/1985 |

(Continued)

OTHER PUBLICATIONS

International Search Report issued in PCT/JP2018/036821 dated Jan. 15, 2019 with English Translation (5 pages).

(Continued)

*Primary Examiner* — Waqaas Ali

(74) *Attorney, Agent, or Firm* — Nakanishi IP Associates, LLC

(57) ABSTRACT

An inner case being substantially cylindrical and being covered at an upper end is provided to cover a heater being substantially rod-shaped. A float being substantially plate-shaped and having substantially the same inner diameter as an inner diameter of the inner case is provided movably in the vertical direction in the inner case, and in the float, a hole through which the heater is inserted is formed. Gas is enclosed in a space surrounded by the inner case and the float. The length in the vertical direction of the inner case is smaller than the length in the vertical direction of the heater. In addition, when the float is positioned at a lower end of the inner case, a gap exists between the float and a bottom surface of a filter case.

12 Claims, 9 Drawing Sheets

(51) Int. Cl.
*B01D 53/92* (2006.01)
*B01D 29/21* (2006.01)
*B01D 35/18* (2006.01)

(52) U.S. Cl.
CPC ...... *B01D 53/92* (2013.01); *B01D 2201/0415* (2013.01); *B01D 2201/64* (2013.01)

(58) Field of Classification Search
CPC ........ B01D 2201/0415; B01D 2201/64; B01D 35/0276; B01D 53/9431; B01D 2251/2067; B01D 29/11
See application file for complete search history.

(56) References Cited

U.S. PATENT DOCUMENTS

| | | | |
|---|---|---|---|
| 4,668,393 A | 5/1987 | Stone | |
| 4,878,536 A * | 11/1989 | Stenlund | F28F 19/01 123/196 AB |
| 2003/0080036 A1 | 5/2003 | Nguyen | |
| 2012/0103884 A1 | 5/2012 | Hardouin et al. | |
| 2012/0312733 A1 | 12/2012 | Elayed et al. | |
| 2015/0008172 A1 | 1/2015 | Kocksch | |
| 2015/0014237 A1 | 1/2015 | Kocksch | |

FOREIGN PATENT DOCUMENTS

| | | | |
|---|---|---|---|
| JP | H09-510518 A | 10/1997 | |
| JP | 2012-522631 A | 9/2012 | |
| JP | 2013-510712 A | 3/2013 | |
| WO | 95/13468 A1 | 5/1995 | |
| WO | 02/36940 A1 | 5/2002 | |
| WO | 2013/092010 A2 | 6/2013 | |
| WO | 2017/025161 A1 | 2/2017 | |
| WO | WO-2017115250 A1 * | 7/2017 | ............. B01D 29/21 |

OTHER PUBLICATIONS

Office Action issued in Chinese Patent Application No. 201880059822.3 dated Jun. 28, 2021, with English Translation (15 pages).

* cited by examiner

FILTER DEVICE

CROSS-REFERENCE TO RELATED APPLICATIONS

This application is a continuation application of International Patent Application No. PCT/JP2018/036821 filed on Oct. 2, 2018, which claims priority to Japanese Patent Application No. 2017-195833 filed on Oct. 6, 2017, the entire contents of which are incorporated by reference.

TECHNICAL FIELD

The present invention relates to a filter device and a filtration device.

BACKGROUND ART

Patent Document 1 discloses a liquid filter structure in which a shrinkable element including a package having gas enclosure volume is disposed in a filter housing, and the shrinkable element shrinks in response to pressure generated by the freezing of liquid in a filtration housing.

CITATION LIST

Patent Document

Patent Document 1: Japanese Translation of PCT International Application Publication No. 2013-510712

Urea water is generally used to remove a nitrogen oxide incorporated in exhaust gas discharged from an engine. However, urea water is liable to freeze at a low temperature, and when the urea water freezes and expands inside a filter device, a filter case and a filter element may break.

The cited Patent Document 1 is made to prevent the breakage of the filter element and the filter housing by the shrinkage of the shrinkable element. However, the invention described in Patent Document 1 cannot prevent the freezing of liquid.

SUMMARY OF INVENTION

One or more embodiments of the present invention has been made in view of such circumstances, and provide a filter device and a filtration device capable of preventing the freezing of liquid and also preventing the breakage of the device even when the liquid freezes.

A filter device according to one or more embodiments of the present invention includes: a filter case including an inflow portion and an outflow portion for liquid; a filter element including a filtration material configured to filter the liquid and an inner cylinder having a substantially cylindrical shape and provided inside the filtration material, the filter element having a substantially cylindrical shape covered at both ends and the filter element being provided inside the filter case to have a center axis extending in a vertical direction; and a heater being substantially rod-shaped and extending in the vertical direction inside the filter case, the heater being provided at a position different from a position of the filter element in a plan view. In the filter device, the inner cylinder includes a side surface being substantially cylindrical, and a partition plate covering a hollow part of the side surface in a plan view, a plurality of holes through which the liquid passes are formed at a first region positioned above the partition plate in the vertical direction in the side surface, gas is enclosed in a space surrounded by a second region positioned below the partition plate in the vertical direction in the side surface and the partition plate, and a gap exists between a lower end surface of the inner cylinder and a bottom surface of the filter case.

According to one or more embodiments of the filter device of the present invention, the heater being substantially rod-shaped extends in the vertical direction inside the filter case. Thus, the liquid and the heater come into contact with each other, and the freezing of the liquid can be prevented. In addition, according to the filter device of the present invention, gas is enclosed in the space surrounded by the second region positioned below the partition plate in the vertical direction in the side surface of the inner cylinder, and the partition plate, and the gap exists between the lower end surface of the inner cylinder and the bottom surface of the filter case. Therefore, when the liquid freezes and expands, and thus even when the liquid freezes, the breakage of the device can be prevented.

Here, the filter element may include a first float provided movably in the vertical direction and having a diameter substantially (or approximately) equal to an inner diameter of the inner cylinder, gas may be enclosed in a space surrounded by the second region in the side surface, the partition plate and the first float, when the first float is positioned at a lower end, the first float may be positioned near (at) a lower end of the inner cylinder and a gap may exist between the first float and the bottom surface. In a process in which the liquid freezes and the volume increases, the first float is pushed up while compressing air enclosed in a space surrounded by the side surface of the inner cylinder, the partition plate and the first float. Thus, even when the liquid freezes, the breakage of the device can be prevented.

Here, the bottom surface may be provided with a projection protruding inward of the inner cylinder, and a gap may exist between the projection and the inner cylinder. Thus, the volume of a space surrounded by the second region positioned below the partition plate in the vertical direction in the side surface and the partition plate can be reduced, and a defect due to air (for example, a defect such as the pressure of an injector that does not rise to a predetermined pressure at the time of the start of a construction machine) can be prevented.

Here, the projection may have a substantially cylindrical shape covered at an end surface, and the gap between the projection and the inner cylinder may be not greater than half of a radius of the projection. Thus, the volume of the space surrounded by the second region positioned below the partition plate in the vertical direction in the side surface and the partition plate can be reduced, and a defect due to air can be prevented.

Here, the filter device may include an inner case being substantially cylindrical and being covered at an upper end, the inner case being provided to cover the heater, and a second float being substantially plate-shaped and provided near (at) a lower end of the inner case movably in the vertical direction, the second float having a diameter substantially equal to an inner diameter of the inner case, a hole through which the heater is inserted may be formed in the second float, the hole having a diameter substantially (or approximately) the same as a diameter of an outer shape of the heater, gas may be enclosed in a space surrounded by the inner case and the second float, a length in the vertical direction of the inner case may be smaller than a length in the vertical direction of the heater, and when the second float is positioned at a lower end of the inner case, a gap may exist between the second float and the bottom surface. Thus, in a process in which the liquid freezes and the volume increases, the liquid pushes up the second float while compressing air enclosed in the space surrounded by the inner case and the second float, and accordingly even when the liquid freezes, the breakage of the device can be prevented.

Here, the filter case may include a first cylindrical portion extending in the vertical direction along the filter element, and a second cylindrical portion extending in the vertical direction along the heater, a diameter of the second cylindrical portion may be smaller than a diameter of the first cylindrical portion, and in a plan view, the first cylindrical portion and the second cylindrical portion may be connected. Thus, the volume (quantity of water) of the liquid stored in the filter case can be reduced, and a volume change during freezing can be reduced.

Here, in a plan view, the filter element and the inner case may be provided adjacently, the filter case may include a first cylindrical portion extending in the vertical direction along the filter element, and a second cylindrical portion extending in the vertical direction along the inner case, a diameter of the second cylindrical portion may be smaller than a diameter of the first cylindrical portion, and in a plan view, the first cylindrical portion and the second cylindrical portion may be connected. Thus, the volume (quantity of water) of the liquid stored in the filter case can be reduced, and a volume change during freezing can be reduced.

Here, the filter device may include an air vent including an air vent hole formed in an upper surface of the filter case and a valve provided below the air vent hole, and the valve may include a float floating in the liquid. Thus, it is possible to prevent the unfiltered liquid from flowing out from the filter case while removing air in the filter case.

Here, the heater may include a pipe and warm the liquid by causing an antifreeze solution to flow inside the pipe. Thus, it is unnecessary to use electricity to warm the liquid, and safety is achieved.

Here, the filter element may include a plate covering the filtration material and an upper end of the inner cylinder, the plate may be provided below an upper end surface of the filter case, the outflow portion may be provided on the upper end surface of the filter case, and a through-hole communicating an internal space of the inner cylinder with the outflow portion may be formed in the plate, the through-hole including a portion having a substantially truncated cone shape including an upper side having a smaller inner diameter than an inner diameter of a lower side. In addition, a diameter of the plate may be larger than a diameter of the filtration material, and a ring having a substantially cylindrical shape may be provided below the plate and outside the filtration material. In addition, a ring having a substantially cylindrical shape may be provided below the upper end surface of the filter case and outside the heater. Thus, it is possible to reduce an amount of air that accumulates inside the filter device when the filter device is inclined, and to prevent a defect due to air that is supplied to a pump or an injector when the inclination of the filter device is eliminated.

According to one or more embodiments of the present invention, the freezing of liquid can be prevented and the breakage of a device can also be prevented even when the liquid freezes.

DESCRIPTION OF EMBODIMENTS

Hereinafter, embodiments of the present invention will be described in detail with reference to the drawings. The present invention is used in a selective catalytic reduction (SCR) type urea SCR system that reduces NOx (nitrogen oxide) incorporated in exhaust of an internal combustion engine (particularly a diesel engine).

Figure 9:
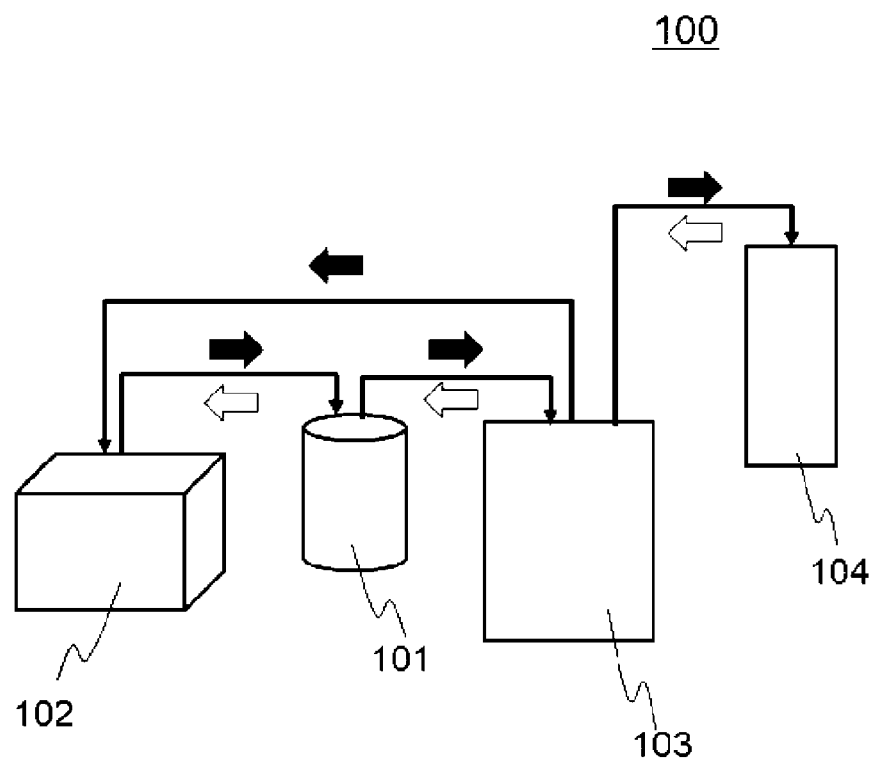
FIG. 9 is a view schematically illustrating a typical urea SCR system 100.

FIG. 9 is a view schematically illustrating a typical urea SCR system 100. The urea SCR system 100 mainly includes a filter device 101, a tank 102, a pump 103, and an injector 104. When an engine of a construction machine or the like in which the urea SCR system 100 is mounted is started, urea water stored in the tank 102 is sucked up by the pump 103. Thus, the urea water passes through the tank 102, the filter device 101, and the pump 103 to be supplied to the injector 104, and is sprayed from the injector 104 (see black arrows in FIG. 9). Some of the urea water is returned from the pump 103 to the tank 102 (see the black arrow in FIG. 9). When the engine of the construction machine or the like is stopped, the urea water inside the filter device 101, the pump 103, and the injector 104 is returned to the tank 102 to prevent the freezing of the urea water (see hollow arrows in FIG. 9).

Hereinafter, the present invention will be described in a case where urea water is used as fluid, taking a filter device used in the urea SCR system 100 as an example, but the present invention can be applied to various kinds of fluid capable of reducing NOx.

First Embodiment

Figure 1:
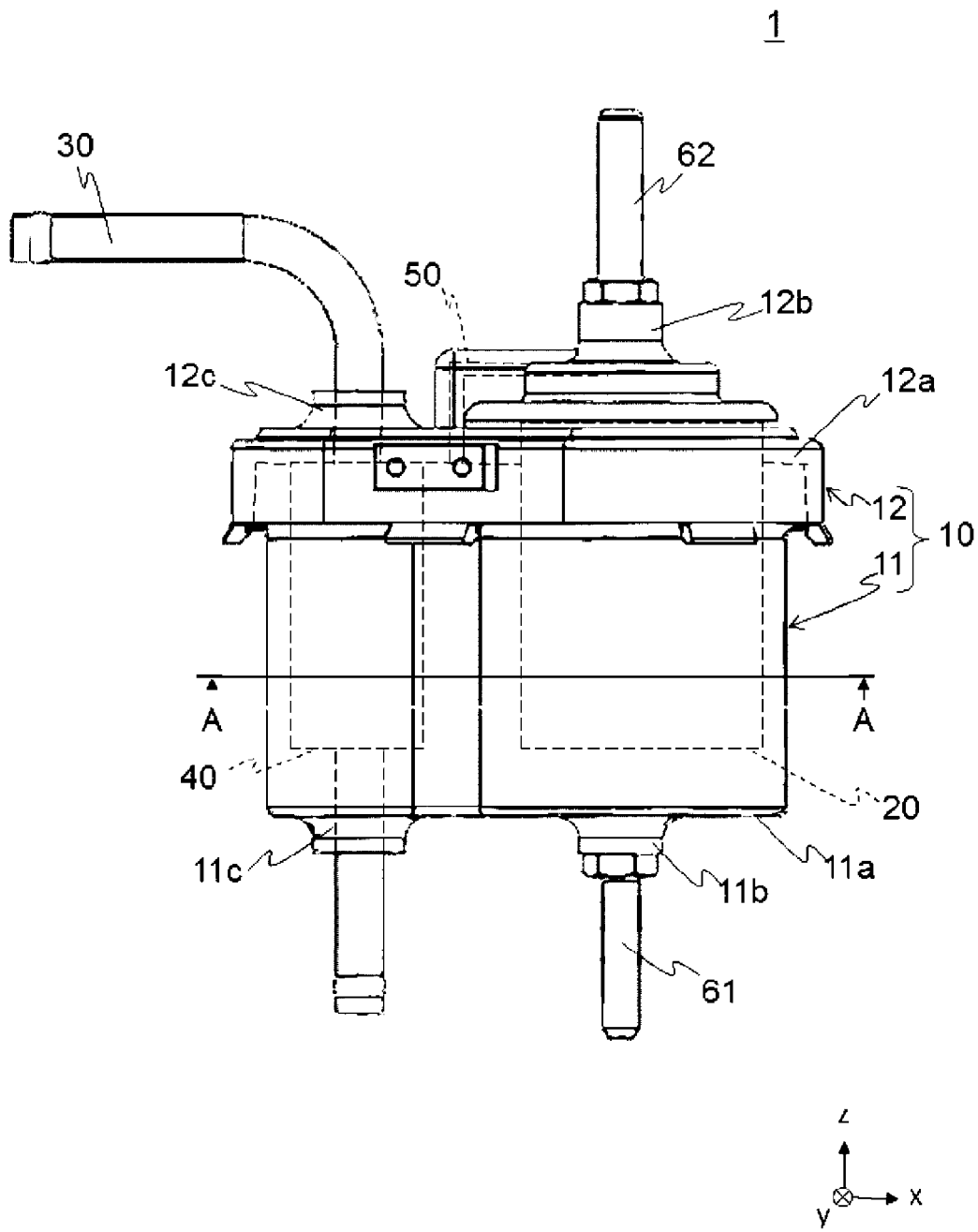
FIG. 1 is a view schematically illustrating a filter device 1 according to an embodiment of the present invention.

FIG. 1 is a view schematically illustrating a filter device 1 according to an embodiment of the present invention. The filter device 1 mainly includes a filter case 10, a filter element 20, a heater 30, an adjustment portion 40, and an air vent 50.

The filter case 10 mainly includes a filter case body 11 and a lid 12. The filter element 20, the heater 30, and the adjustment portion 40 are mainly provided inside the filter case 10.

The filter case body 11 is a substantially cylindrical member with a bottom and includes a hollow inside. An upper end surface of the filter case body 11 is open. An inflow portion 11b through which urea water flows into the filter device 1 is formed in a bottom surface 11a of the filter case body 11. The inflow portion 11b is provided with an inflow pipe 61. In addition, a heater mounting hole 11c into which the heater 30 is inserted is formed in the bottom surface 11a.

The lid 12 is a member that covers an open end of an upper part of the filter case body 11 and constitutes an upper surface of the filter case 10. The lid 12 is provided detachably in the filter case body 11. An outflow portion 12b through which the urea water flows out of the filter device 1 is formed in a bottom surface 12a (an upper end surface of the filter case 10). The outflow portion 12b is provided with an outflow pipe 62. In addition, a heater mounting hole 12c into which the heater 30 is inserted is formed in the bottom surface 12a.

Figure 2:
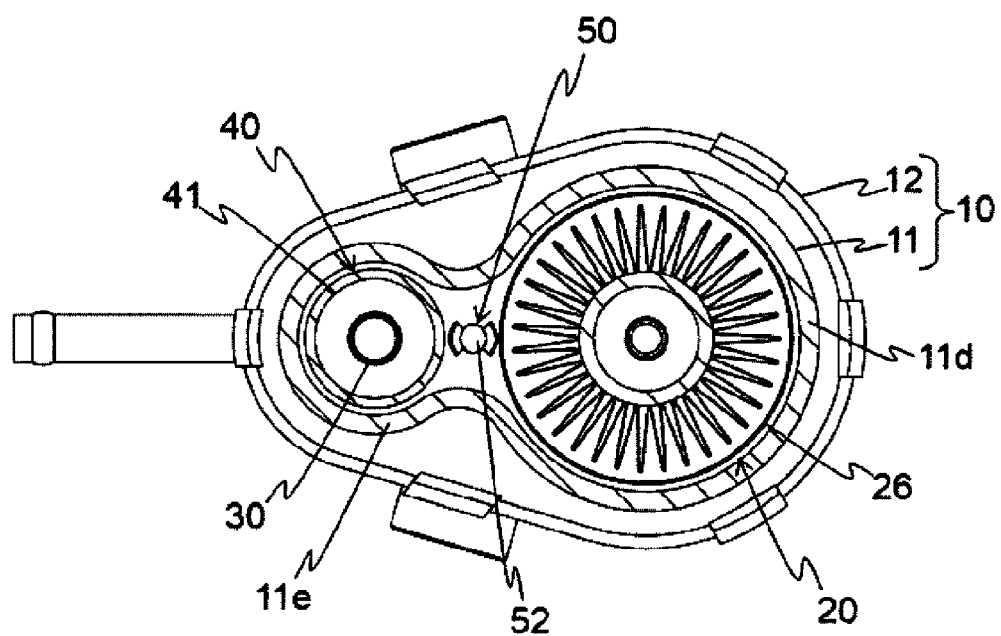
FIG. 2 is a cross sectional view taken along line A-A of FIG. 1.
Figure 2:
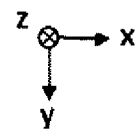

FIG. 2 is a cross sectional view taken along line A-A of FIG. 1. In a plan view (as viewed from a z-direction), the filter element 20 and the adjustment portion 40 are provided adjacently. A side surface of the filter case body 11 includes a cylindrical portion 11d along a side surface (here, an outer cylinder 26) of the filter element 20, and a cylindrical portion 11e along a side surface of the adjustment portion 40. The cylindrical portions 11d, 11e are substantially cylindrical and extend in a vertical direction. In a plan view, the cylindrical portion 11d and the cylindrical portion 11e are connected, and the filter case body 11 is recessed between the filter element 20 and the adjustment portion 40. Thus, the side surface of the filter case body 11 is shaped into a gourd-like shape in a plan view, and thus, the volume (quantity of water) of the urea water stored inside the filter case 10 can be reduced, and a volume change during freezing can be reduced.

Note that it is not essential to make a recess between the filter element 20 and the adjustment portion 40 in the side surface of the filter case body 11. However, to reduce the volume of the urea water stored inside the filter case 10 as much as possible, it is desirable to make a recess between the filter element 20 and the adjustment portion 40.

Figure 3:
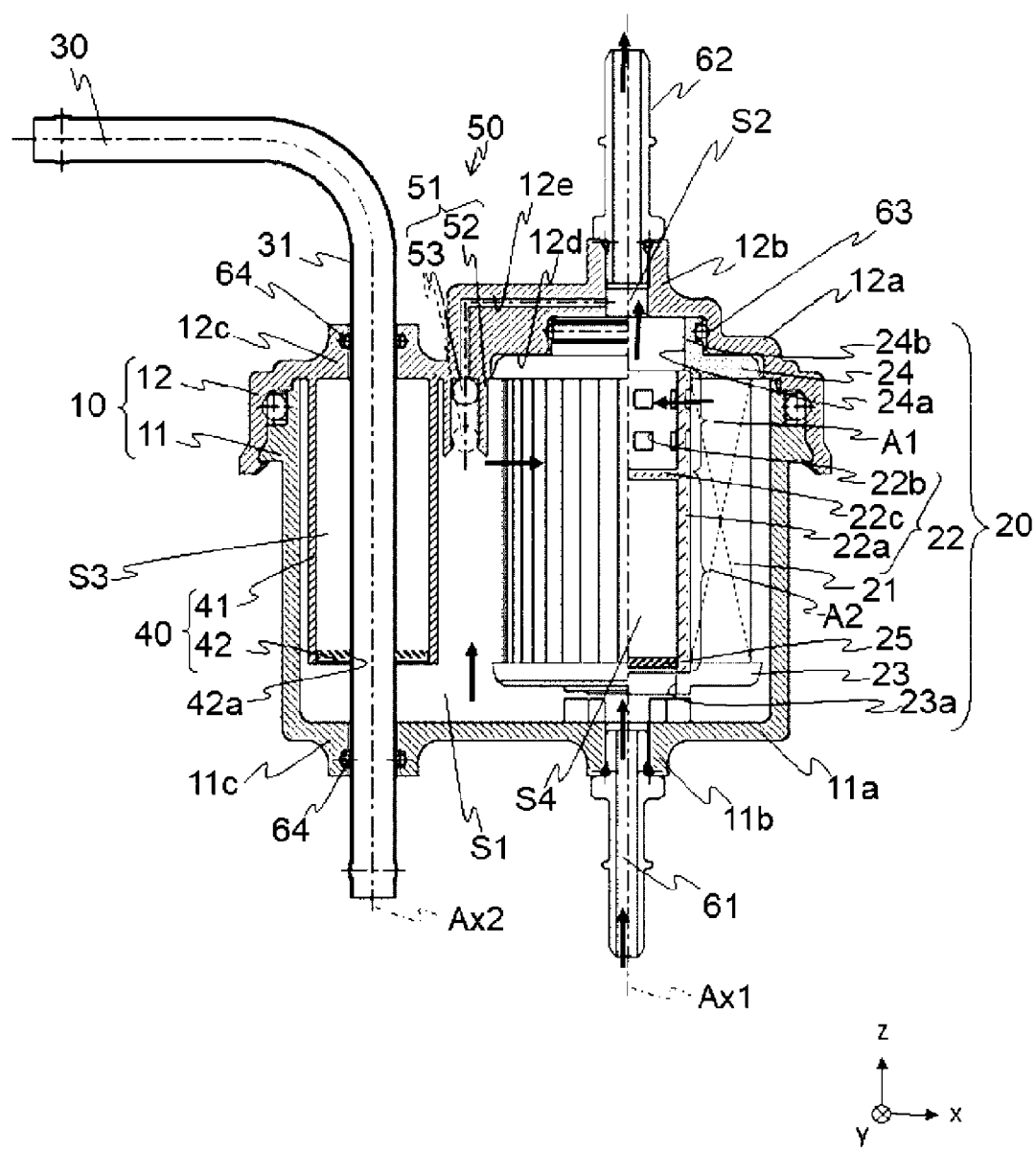
FIG. 3 is a cross sectional view schematically illustrating the filter device 1.

FIG. 3 is a cross sectional view schematically illustrating the filter device 1. FIG. 3 illustrates the case where the urea water is not frozen. Note that in FIG. 2, hatching illustrating a cross section is omitted as for some components.

The filter element 20 is a member having a substantially cylindrical shape covered at both ends. The filter element 20 is provided inside the filter case 10 to have a center axis Ax1 extending in the vertical direction (z-direction). The filter element 20 mainly includes a filtration material 21, an inner cylinder 22, plates 23, 24, a float 25, and an outer cylinder 26 (not illustrated in FIG. 3, see FIG. 2).

The filtration material 21 is configured to filter the urea water, and has a substantially cylindrical shape having the thickness in a radial direction. The filtration material 21 is formed by pleating a filter paper formed with a synthetic resin, paper, or the like, and connecting both ends of the pleated filter paper to roll into a cylindrical shape.

The inner cylinder 22 is a member having a substantially cylindrical shape and made of a resin, and is provided inside the filtration material 21. The height of the inner cylinder 22 and the height of the filtration material 21 are substantially the same.

A side surface 22a being substantially cylindrical of the inner cylinder 22 includes a first region A1 located above in the vertical direction and a second region A2 located below the first region A1 in the vertical direction. The first region A1 includes an upper end of the inner cylinder 22, and the second region A2 includes a lower end of the inner cylinder 22. In the first region A1 of the side surface 22a, a hole 22b through which urea water passes is formed substantially in the entire surface, but in the second region A2 of the side surface 22a, no hole 22b is formed.

Note that in the present embodiment, the first region A1 is substantially ⅓ of the overall height of the inner cylinder 22, but the height of the second region A2 is not limited to this. However, it is desirable that the height of the first region A1 is substantially not greater than half of the height of the inner cylinder 22.

The inner cylinder 22 includes a partition plate 22c that partitions the first region A1 and the second region A2. The diameter of the partition plate 22c is substantially the same as the inner diameter of the side surface 22a. In a plan view, the partition plate 22c covers a hollow part of the inner cylinder 22. A position in a height direction (z-direction) of the partition plate 22c is between the first region A1 and the second region A2. In other words, the first region A1 is positioned above the partition plate 22c in the vertical direction, and the second region A2 is positioned below the partition plate 22c in the vertical direction.

The plates 23, 24 are substantially plate-shaped members and are formed with a resin or metal. The plate 23 covers lower ends of the filtration material 21 and the inner cylinder 22, and the plate 24 covers upper ends of the filtration material 21 and the inner cylinder 22. The plates 23, 24 include through-holes 23a, 24a, respectively, and the through-holes 23a, 24a are formed substantially in the center. The through-holes 23a, 24a are substantially the same as the inner diameter of the inner cylinder 22.

The plate 24 includes a projecting part 24b projecting upward. The projecting part 24b is inserted into a recessed part 12d of the lid 12. The projecting part 24b is provided with a sealing member 63 such as an O-ring, and the sealing member 63 is provided between the projecting part 24b and the recessed part 12d. Accordingly, the plate 24, that is, the filter element 20 is attached to the lid 12. In a state where the filter element 20 is attached to the lid 12, a gap exists between the plate 23 and the bottom surface 11a.

The float 25 is a plate-shaped member and is provided near the lower end of the inner cylinder 22 movably in the vertical direction along the inner cylinder 22. In a state illustrated in FIG. 3, the float 25 is positioned at the lower end, and positions in the height direction of the float 25 and the plate 23 are substantially identical with each other. Gas is enclosed in a space S4 surrounded by the side surface 22a, the partition plate 22c, and the float 25.

The heater 30 is a substantially rod-shaped member and extends in the vertical direction inside the filter case 10. In the present embodiment, the heater 30 warms the urea water in the filter case 10 by causing an antifreeze solution to flow inside the pipe 31. Here, as the antifreeze solution, an LLC (Long Life Coolant) containing ethylene glycol as a main component and added with a rust preventive or the like can be used, but the antifreeze solution is not limited to this. The pipe 31 is fixed to the filter case 10 via a sealing member 64 such as an O-ring.

However, a mode of the heater that warms the urea water not to freeze the urea water is not limited to this, and for example, an electric heating rod or a ceramic heater may be used. The electric heating rod and the ceramic heater are fixed to the filter case 10 by screwing or the like. However, when the heater 30 that causes the antifreeze solution to flow inside the pipe 31 is used, since electricity is not used, safety is high.

The adjustment portion 40 is a member for adjustment performed when the urea water freezes and the volume increases, and is provided inside the filter case 10 to cover the heater 30. The adjustment portion 40 mainly includes an inner case 41 being substantially cylindrical and covered at an upper end, and a float 42 being substantially plate-shaped and provided near a lower end of the inner case 41.

The inner case 41 is integrally formed with the bottom surface 12a to project from the lid 12 into the filter case 10. A center axis of the inner case 41 is substantially identical with a center axis Ax2 of the heater 30. The length in the vertical direction of the inner case 41 is smaller than the length in the vertical direction of the heater 30. Therefore, the heater 30 comes into contact with the urea water in the filter case 10, and the urea water is warmed by the heater 30.

The outer diameter of the float 42 is substantially the same as the inner diameter of the inner case 41. A hole 42a through which the heater 30 is inserted is formed in the float 42. The diameter of the hole 42a is substantially the same as the diameter of an outer shape of the heater 30.

Gas (here, air) is enclosed in a space S3 surrounded by the inner case 41 and the float 42. In a state where the float 42 is positioned at the lower end of the inner case 41, a gap exists between the float 42 and the bottom surface 11a.

The float 42 is provided movably in the vertical direction along the heater 30 and the inner case 41. When the float 42 moves, an outer peripheral surface of the float 42 and an inner peripheral surface of the inner case 41 slide, and an inner peripheral surface of the float 42 and an outer peripheral surface of the heater 30 slide.

In a plan view, an air vent 50 is provided between the filter element 20 and the inner case 41. The air vent 50 includes an air vent hole 12e formed in the lid 12 and a valve 51. The air vent hole 12e communicates an internal space (space S1) of the filter case 10 with an external space of the filter case 10. Note that in the present embodiment, the air vent hole 12e is substantially L-shaped and communicates with the external space of the filter case 10 via a space S2, but a mode of the air vent hole 12e is not limited to this. For example, an air vent hole may penetrate the bottom surface 12a in the z-direction to communicate the internal space of the filter case 10 with the external space of the filter case 10.

The valve 51 is provided below the air vent hole 12e. The valve 51 includes a plurality of ribs 52 formed to project from the bottom surface 12a into the filter case 10, and a float 53. The float 53 is formed to float on the urea water and moves up and down along the ribs 52. A stopper that regulates the downward movement of the float 53 is formed at lower ends of the ribs 52.

Note that a position of the air vent 50 is not limited to the position between the filter element 20 and the inner case 41. However, to reduce the size of the filter case 10 and to reduce the volume (quantity of water) of the urea water stored inside the filter case 10, it is desirable to provide the air vent 50 between the filter element 20 and the inner case 41.

Next, a function of the filter device 1 thus configured will be described with reference to FIG. 3. Arrows in FIG. 3 indicate a flow of the urea water.

The urea water flows into the space S1 inside the filter case 10 via the inflow portion 11b and the inflow pipe 61. The urea water flows from the outside of the filtration material 21 to the inside of the filtration material 21, and accordingly the urea water is filtered. The filtered urea water passes through the hole 22b formed in the inner cylinder 22 to flow out to the space S2.

Normally, a gap exists between the float 53 and the bottom surface 12a, and the air vent hole 12e is open. Therefore, even when air incorporated in the urea water accumulates in the space S1, air accumulated in an upper part of the space S1 is discharged from the space S1 via the air vent hole 12e.

The urea water stored in the space S1 is heated by the heater 30. However, there is a possibility that the urea water freeze due to a decrease in air temperature or the like even when the urea water is heated by the heater 30.

Figure 4:
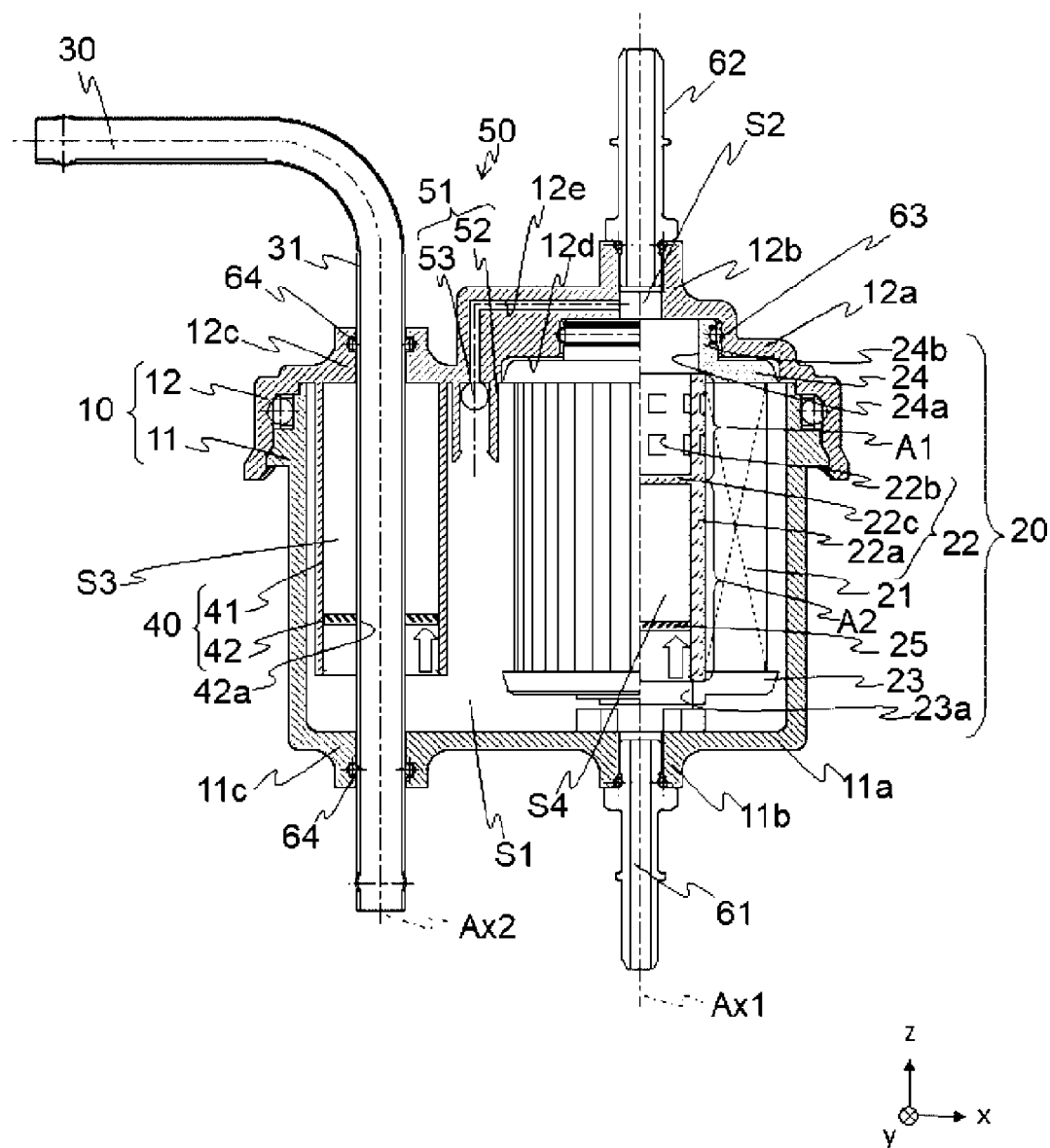
FIG. 4 is a cross sectional view schematically illustrating the filter device 1 and illustrates a state in which urea water is frozen.

FIG. 4 is a cross sectional view schematically illustrating the filter device 1 and illustrates a state in which the urea water is frozen. Note that in FIG. 4, hatching illustrating a cross section is omitted as for some components.

When the urea water freezes, the volume of the urea water increases by about 7%. Since the gaps exist between the bottom surface 11a and the floats 25, 42, in a process in which the urea water freezes, the urea water pushes up the float 42 in the +z-direction while compressing air in the space S3, and pushes up the float 25 in the +z-direction while compressing air in the space S4, as illustrated by hollow arrows in FIG. 4.

Thus, a space in which the urea water confined in the space S1 can expand is provided, and accordingly damage to the filter case 10, the filter element 20, or the like can be prevented.

The urea water having entered the space S3 by pushing up the float 42 is warmed by the heater 30. Thus, the contact area between the urea water and the heater 30 is increased during freezing, and the urea water can be warmed effectively.

When the urea water freezes, since the space S1 is filled with the urea water, the float 53 is pushed up by the urea water to block the air vent hole 12e. Thus, the urea water unfiltered is prevented from flowing out of the space S1.

According to the present embodiment, the freezing of the urea water can be prevented by using the heater 30. In addition, the floats 25, 42 are pushed up during freezing, and accordingly even when the urea water freezes, the breakage of the filter device 1 can be prevented.

In addition, according to the present embodiment, since the float 25 is moved up and down inside the inner cylinder 22 and the float 42 is moved up and down inside the inner case 41, it is possible to provide a breakage prevention mechanism to be used during freezing while the filter device keeps the same size as the size of a conventional filter device. For example, when the breakage prevention mechanism is provided in a space separate from the filter element, the size of the filter case needs to be increased. On the other hand, in the present embodiment, space-saving can be achieved, and the breakage prevention mechanism can be provided without increasing the size of the filter case 10.

In addition, according to the present embodiment, the side surface of the filter case body 11 is shaped into a substantially cylindrical shape including the cylindrical portion 11d along the outer cylinder 26 and the cylindrical portion 11e along the inner case 41, and accordingly the volume (quantity of water) of the urea water stored inside the filter case 10 can be reduced, and a volume change during freezing can be reduced.

In addition, according to the present embodiment, since the height of the first region A1 is substantially not greater than half of the height of the inner cylinder 22, the urea water by a volume increase due to the freezing of the urea water can be absorbed reliably by a volume change (decrease) of the spaces S3, S4 made when the floats 25, 42 move in the +z-direction. In addition, the height of the first region A1 is substantially not greater than half of the height of the inner cylinder 22, and accordingly it is possible to prevent an excessive increase of a pressure loss.

Note that although the heater 30 penetrates the filter case 10 in the z-direction in the present embodiment, an arrangement mode of the heater 30 is not limited to this. For example, a part of the heater 30 may extend in the z-direction. In addition, for example, when an electric heating rod or a substantially rod-shaped ceramic heater is used as the heater, one end of the heater may be inside the filter case 10. In these cases, the length of the inner case 41 may be made smaller than the length of the portion of the heater extending in the z-direction.

Second Embodiment

In the first embodiment, the adjustment portion 40 is provided around the heater 30, but the adjustment portion 40 is not essential. In addition, in the first embodiment, gas is enclosed in the space S4 surrounded by the side surface 22a, the partition plate 22c, and the float 25 (air pocket), but a mode of the air pocket is not limited to this. Further, in the first embodiment, the floats 25, 42 are provided, and the urea water pushes up the floats 25, 42 during freezing, but the floats 25, 42 are not essential.

Hereinafter, a filter device 2 according to the second embodiment will be described below. The same components as those of the first embodiment are denoted by the same reference numerals and description of these components will be omitted.

Figure 5:
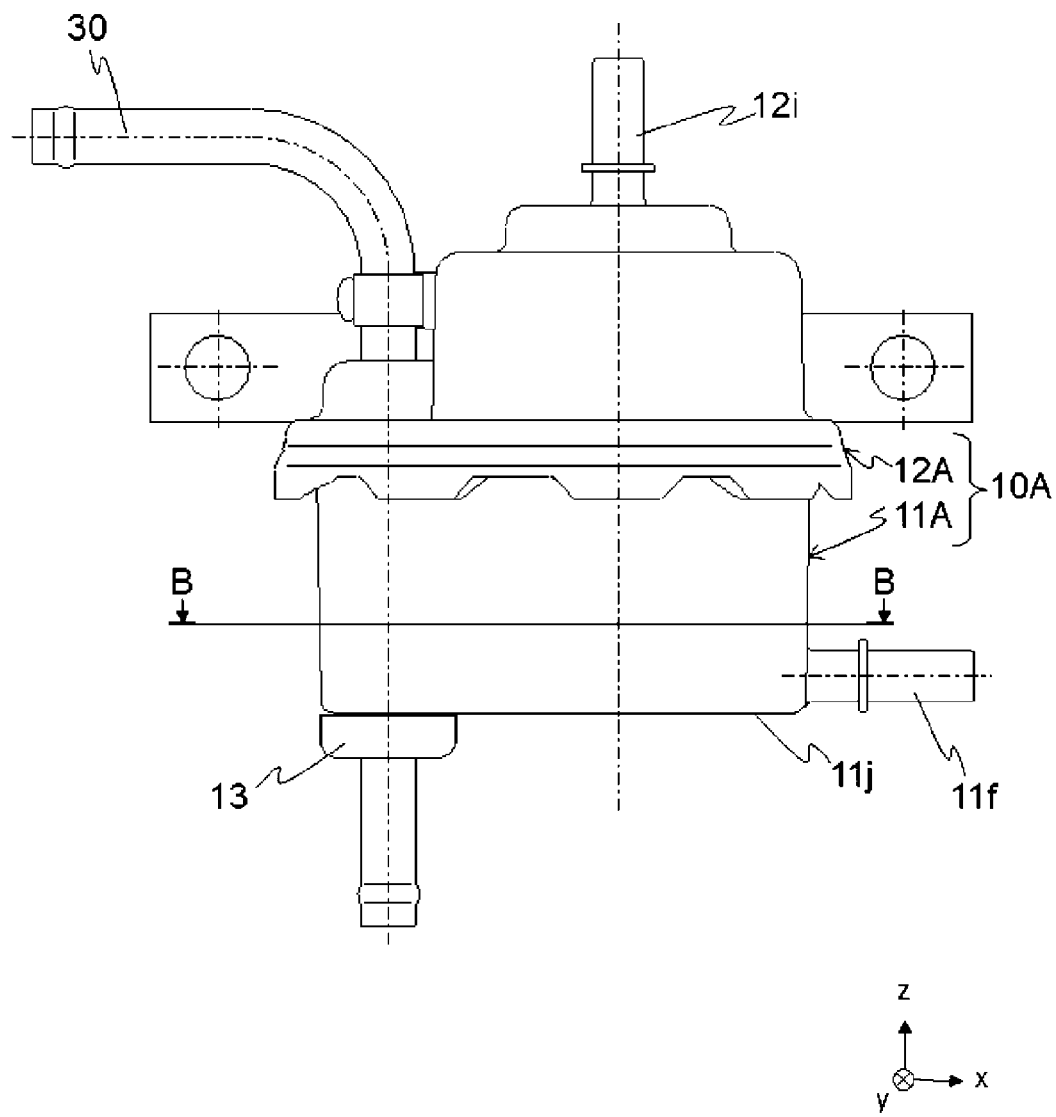
FIG. 5 is a side view schematically illustrating a filter device 2 according to an embodiment of the present invention.
Figure 6:
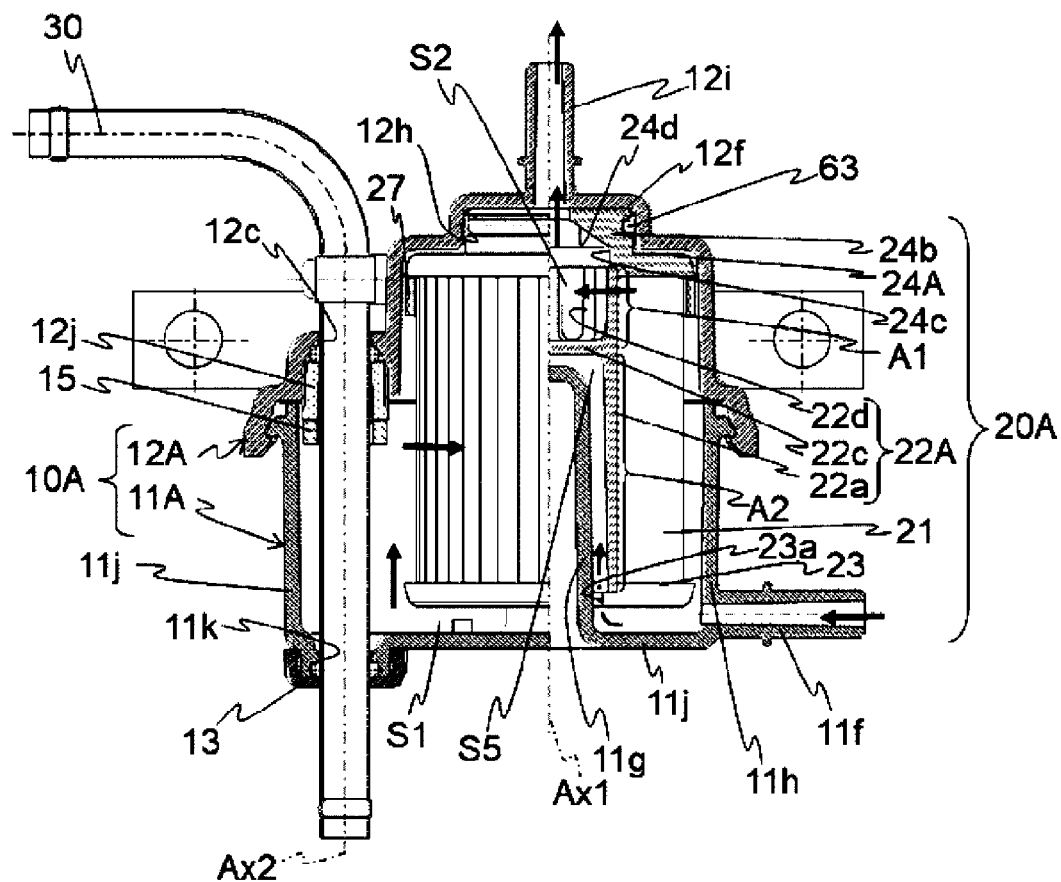
FIG. 6 is a cross sectional view schematically illustrating the filter device 2.

FIG. 5 is a side view schematically illustrating the filter device 2 according to an embodiment of the present invention. FIG. 6 is a cross sectional view schematically illustrating the filter device 2. The filter device 2 mainly includes a filter case 10A, a filter element 20A, and a heater 30.

The filter case 10A mainly includes a filter case body 11A and a lid 12A. The filter element 20A and the heater 30 are mainly provided inside the filter case 10A.

The filter case body 11A is a substantially cylindrical member with a bottom and includes a hollow inside. An upper end surface of the filter case body 11A is open. An inflow portion 11f through which urea water enters the filter device 2 is formed near a bottom surface 11j of a side surface (cylindrical portion 11h) of the filter case body 11A. However, a position of the inflow portion 11f is not limited to this. A projection 11g is provided in the bottom surface 11j (described below).

In addition, a heater mounting hole 11k into which the heater 30 is inserted is formed in the bottom surface 11j. A fixing member 13 is provided below the heater mounting hole 11k, and accordingly the falling off of the heater 30 is prevented.

The lid 12A is a member that covers an open end of an upper part of the filter case body 11A. The lid 12A is provided detachably in the filter case body 11A. An outflow portion 12i through which the urea water flows out of the filter device 2 is formed in a bottom surface 12f (an upper end surface of the filter case 10A).

In addition, a heater mounting hole 12c into which the heater 30 is inserted is formed in the bottom surface 12f. A screw 12j is screwed below the heater mounting hole 12c, and accordingly the heater 30 is fixed to the lid 12A. In addition, a ring 15 having a substantially cylindrical shape is provided below the screw 12j. However, the ring 15 is not essential.

The filter element 20A, as with the filter element 20, is a member having a substantially cylindrical shape covered at both ends, and is provided inside the filter case 10A to have a center axis Ax1 extending in a vertical direction (z-direction). The filter element 20A mainly includes a filtration material 21, an inner cylinder 22A, and plates 23, 24A.

The inner cylinder 22A, as with the inner cylinder 22, is a member having a substantially cylindrical shape and made of a resin, and is provided inside the filtration material 21. A difference between the inner cylinder 22A and the inner cylinder 22 is only a hole 22d formed at a first region A1 of a side surface 22a. At the first region A1, the urea water passes through the hole 22d and passes from the outside of the inner cylinder 22A to the inside of the inner cylinder 22A.

The plates 23, 24A are substantially plate-shaped members and are formed with a resin or metal. The plate 23 covers lower ends of the filtration material 21 and the inner cylinder 22A, and the plate 24A covers upper ends of the filtration material 21 and the inner cylinder 22A.

The plate 24A includes a projecting part 24b projecting upward. The projecting part 24b is inserted into a recessed part 12h of the lid 12A. The projecting part 24b is provided with a sealing member 63 such as an O-ring, and the sealing member 63 is provided between the projecting part 24b and the recessed part 12h, and accordingly the plate 24A (that is, the filter element 20A) is attached to the lid 12A. In a state where the filter element 20A is attached to the lid 12A, a gap exists between the plate 23 and the bottom surface 11j. In addition, in a state where the filter element 20A is attached to the lid 12A, a ring 27 having a substantially cylindrical shape is provided below the plate 24A. However, the ring 27 is not essential.

A through-hole 24c is formed inside the projecting part 24b. The through-hole 24c is a hole that communicates an internal space of the first region A1 of the inner cylinder 22A with the outflow portion 12i. The inner diameter on the lower end side of the through-hole 24c is substantially the same as the inner diameter of the inner cylinder 22A, and the inner diameter on the upper end side of the through-hole 24c is substantially the same as the inner diameter of the outflow portion 12i. The through-hole 24c includes a connecting part 24d having a substantially truncated cone shape including an upper side having a smaller diameter than the diameter of a lower side.

Preferably, the height of the connecting part 24d is substantially not less than half of the height of the through-hole 24c.

A through-hole 23a is formed in the plate 23. The projection 11g projects inward of the inner cylinder 22A via the through-hole 23a. In the present embodiment, the projection 11g has a substantially cylindrical shape covered at an end surface, but the shape of the projection 11g is not limited to this.

Gaps exist between the projection 11g and the through-hole 23a, and between the projection 11g and the inner cylinder 22A (between the projection 11g and the side surface 22a, and between the projection 11g and the partition plate 22c). Gas is enclosed in a space S5 surrounded by the side surface 22a, the partition plate 22c, and the projection 11g.

The present embodiment is characterized in that the projection 11g is provided, and accordingly the volume of the space S5 is reduced. For example, the gap between the projection 11g and the inner cylinder 22A is set to be not greater than half of the radius of the projection 11g.

Figure 7:
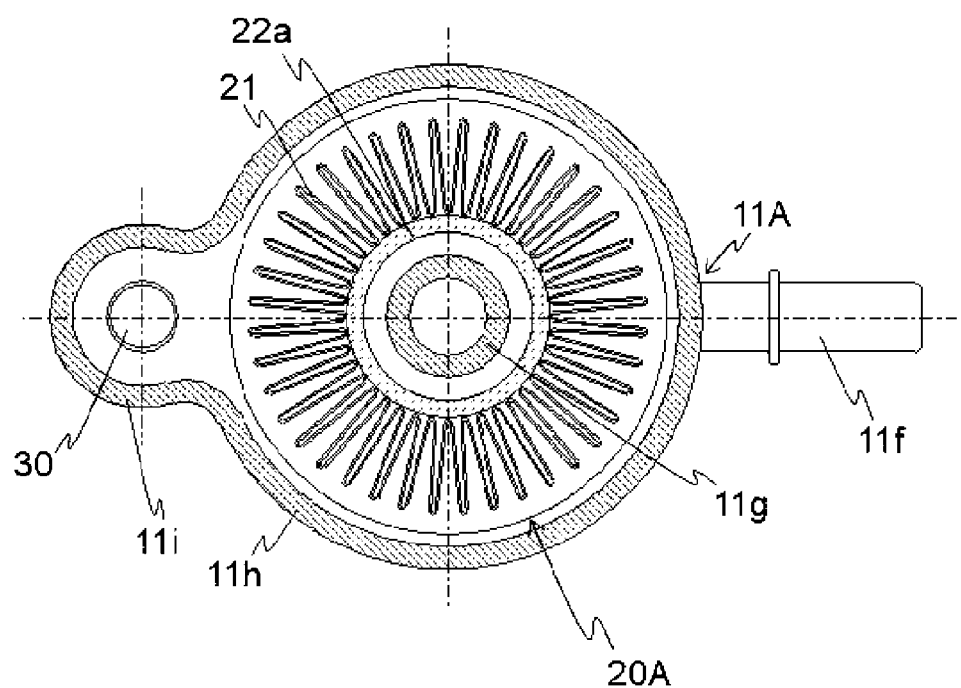
FIG. 7 is a cross sectional view taken along line B-B of FIG. 5.

FIG. 7 is a cross sectional view taken along the line B-B of FIG. 5. In a plan view (as viewed from the z-direction), the filter element 20A and the heater 30 are provided adjacently. The side surface of the filter case body 11A includes a cylindrical portion 11h along a side surface (here, an outer cylinder 26) of the filter element 20A, and a cylindrical portion 11i along a side surface of the heater 30. The cylindrical portions 11h, 11i are substantially cylindrical and extend in the vertical direction. In a plan view, the cylindrical portion 11h and the cylindrical portion 11i are connected. Thus, the side surface of the filter case body 11A is shaped into a gourd-like shape in a plan view, and accordingly the volume (quantity of water) of the urea water stored inside the filter case 10A can be reduced.

Next, a function of the filter device 2 thus configured will be described with reference to FIG. 6. Arrows in FIG. 6 indicate a flow of the urea water.

The urea water flows into a space S1 inside the filter case 10A via the inflow portion 11f. The urea water flows from the outside of the filtration material 21 to the inside of the filtration material 21, and accordingly the urea water is filtered. The filtered urea water flows out to a space S2 through the hole 22d formed in the inner cylinder 22A.

The urea water stored in the space S1 is warmed by the heater 30. However, there is a possibility that the urea water freeze due to a decrease in air temperature or the like even when the urea water is warmed by the heater 30.

When the urea water freezes, the volume of the urea water increases by about 7%. Since gas is enclosed in the space S5, the urea water compresses the gas in the space S5 in a process in which the urea water freezes. Thus, a space for expansion of the urea water confined in the space S1 is provided inside the filter device 2, and accordingly damage to the filter case 10A and the filter element 20A is prevented.

Note that in the present embodiment, an opening of the space S5 is near the bottom surface 11j and faces downward (-z side). Therefore, even when the filter device 2 is inclined by about 35 degrees, a possibility that the gas enclosed in the space S5 be discharged from the space S5 is still low.

According to the present embodiment, the freezing of the urea water can be prevented by using the heater 30. In addition, the gas enclosed in the space S5 is compressed during freezing, and accordingly even when the urea water freezes, the breakage of the filter device 2 can be prevented.

In addition, according to the present embodiment, the filter element 20A and the heater 30 are brought close to each other, and the cylindrical portions 11h, 11i are provided along the filter element 20A and the heater 30, respectively. Accordingly, the volume of the space S1 is reduced. Therefore, a volume change during freezing can be reduced.

In addition, according to the present embodiment, the projection 11g is provided, and accordingly the volume of the space S5 is reduced. Therefore, the volume of the filter device 2 (space S1, S5), that is, an amount of air enclosed in the spaces S1, S5, can be reduced, and a defect due to the air enclosed in the spaces S1, S5 can be prevented. Hereinafter, a defect due to the volume and air of the filter device 2 will be described in detail.

When the construction machine or the like in which the filter device 2 is mounted in the urea SCR system is stopped, the urea water is returned to the tank to prevent the freezing of the urea water (see FIG. 9). Therefore, each time the construction machine is stopped, the inside of the filter device 2 is filled with gas (air). Subsequently, when the construction machine is started, the air inside the filter device 2 is sucked out by the pump, and then the urea water is supplied from the tank to the filter device 2.

In the urea SCR system, the injector is provided downstream of the filter device 2, but the injector needs to raise pressure to a high pressure (for example, 900 kPa) immediately (for example, within 90 seconds) after the start of the construction machine. However, when an amount of air supplied to the injector is large, a defect such as the pressure that does not rise to a predetermined pressure occurs.

In the present embodiment, since the volume of the spaces S1, S5 is reduced, it is possible to reduce the amount of air supplied to the injector at the time of the start of the construction machine. Therefore, it is possible to prevent a defect due to air, specifically, a defect such as the pressure of the injector that does not rise to a predetermined pressure at the time of the start of the construction machine.

Figure 8:
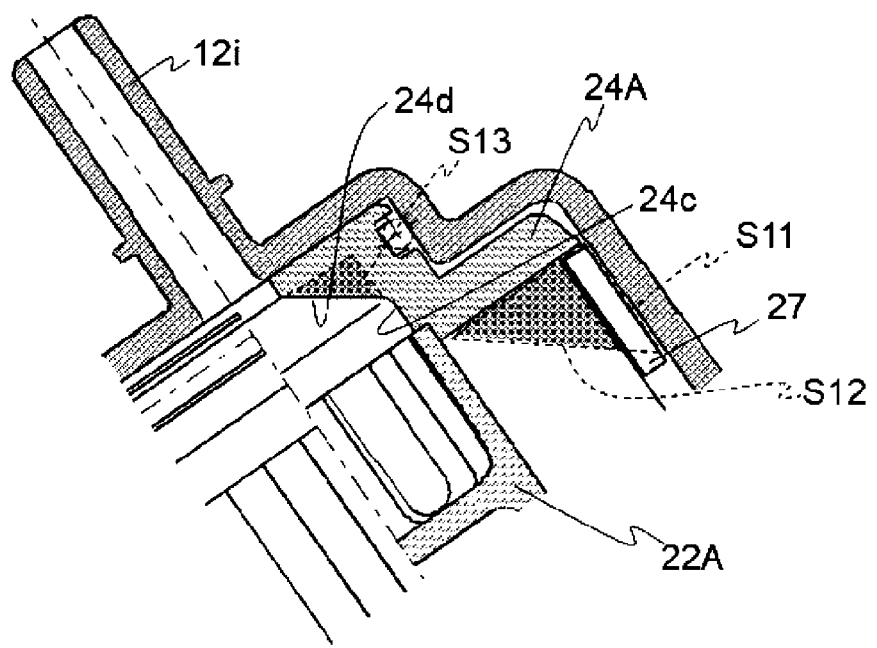
FIG. 8 is a view schematically illustrating a state in which the filter device 2 is inclined.

In addition, according to the present embodiment, since the rings 15, 27 are provided, it is possible to reduce a space in which gas accumulates inside the space S1 when the filter device 2 is inclined. In addition, since the through-hole 24c includes the connecting part 24d, it is possible to reduce a space in which gas accumulates inside the through-hole 24c when the filter device 2 is inclined. FIG. 8 is a view schematically illustrating a state in which the filter device 2 is inclined. When the ring 27 is not provided, a space S11 (see hatching in FIG. 8) to be an air pocket is formed at a corner of the filter element 20A, but the ring 27 is provided, and accordingly the air pocket can be reduced to a space S12 (see hatching in FIG. 8). In addition, when the through-hole 24c does not include the connecting part 24d, a space S13 (see hatching in FIG. 8) to be an air pocket is formed inside the through-hole 24c, but the through-hole 24c includes the connecting part 24d, and accordingly the space 13 can be eliminated. Therefore, it is possible to reduce an amount of air that accumulates inside the filter device 2, and to prevent a defect due to air that is supplied to the pump or the injector when the inclination of the filter device is eliminated.

Although the embodiments of the present invention are described above in detail with reference to the drawings, the specific configurations are not limited to these embodiments, but include design changes or the like within a scope that does not depart from the gist of the present invention. For example, the examples described above are described in detail to facilitate understanding of the present invention, and are not necessarily limited to those including all the described configurations. In addition, the configuration of the embodiment can be replaced partially with the configuration of the different embodiment, or other configurations can be added to, or deleted from, or replaced with the configurations of the embodiments.

In addition, the term "substantially" or "approximately" used in the present application is a concept not only including the case of being strictly the same, but also including deviations and modifications to an extent that the deviations and modifications do not result in a loss of identity. For example, the term "substantially orthogonal" is not limited to the case of being strictly orthogonal, but includes a concept that includes deviations of several degrees, for example. In addition, simple expressions such as orthogonal, parallel, and identical do not only include the case of being strictly orthogonal, parallel, identical, or the like, but also include the case of being substantially parallel, substantially orthogonal, substantially identical, or the like.

In addition, in the present application, the term "near" means to include a region in a certain range (the range can be determined as desired) near a reference position. For example, the term "near an end" refers to a region in a certain range near the end, and is a concept indicating that the region may include the end or may not include the end.

REFERENCE SIGNS LIST 1, 2: Filter device
10, 10A: Filter case
11, 11A: Filter case body
11a, 11j: Bottom surface
11b, 11f: Inflow portion
11c, 11k: Heater mounting hole
11d, 11e, 11h, 11i: Cylindrical portion
11g: Projection 12, 12A: Lid
12a, 12f: Bottom surface
12b, 12i: Outflow portion
12c: Heater mounting hole
12d, 12h: Recessed part
12e: Air vent hole
12j: Screw
13: fixing member
15: Ring
20, 20A: Filter element
21: Filtration material
22, 22A: Inner cylinder
22a: Side surface
22b, 22d: Hole
22c: Partition plate
23, 24, 24A: Plate
23a, 24a, 24c: through-hole
24b: Projecting part
24d: Connecting part
25: Float
26: Outer cylinder
30: Heater
31: Pipe
40: Adjustment portion
41: Inner case
42: Float
42a: Hole
50: Air vent
51: Valve
52: Rib
53: Float
61: Inflow pipe
62: Outflow pipe
63, 64: Sealing member
100: SCR system
101: Filter device
102: Tank
103: Pump
104: Injector

The invention claimed is:

1. A filter device, comprising:
a filter case including an inflow portion and an outflow portion for liquid;
a filter element including a filtration material configured to filter the liquid and an inner cylinder having a cylindrical shape and disposed inside the filtration material, the filter element having a cylindrical shape covered at both ends, and the filter element being disposed inside the filter case to have a center axis extending in a vertical direction; and
a heater being rod-shaped and extending in the vertical direction inside the filter case, the heater being disposed outside the filter element, and a central axis of the heater is different from the central axis of the filter element in a plan view, wherein
the inner cylinder includes a side surface being cylindrical, and a partition plate being disposed between an upper end and a lower end of the filter element in a side view so as to divide an inner space of the inner cylinder into an upper hollow part and a lower hollow part in the side view, the partition plate covering the lower hollow part of the inner cylinder in the plan view,
a plurality of holes through which the liquid passes are formed at a first region positioned above the partition plate in the vertical direction in the side surface,
gas is enclosed in a space surrounded by a second region positioned below the partition plate in the vertical direction in the side surface and the partition plate, and
a gap exists between a lower end surface of the inner cylinder and a bottom surface of the filter case.

2. The filter device according to claim 1, wherein
the filter element includes a first float provided movably in the vertical direction and having a diameter equal to an inner diameter of the inner cylinder,
the space in which the gas is enclosed is surrounded by the second region in the side surface, the partition plate and the first float, and
when the first float is positioned at a lower end, the first float is positioned at a lower end of the inner cylinder and a gap exists between the first float and the bottom surface.

3. The filter device according to claim 1, wherein
the bottom surface is provided with a projection protruding inward of the inner cylinder, and
a gap exists between the projection and the inner cylinder.

4. The filter device according to claim 3, wherein
the projection has a cylindrical shape covered at an end surface, and
the gap between the projection and the inner cylinder is not greater than half of a radius of the projection.

5. The filter device according to claim 1, wherein
the filter device includes
an inner case being cylindrical and being covered at an upper end, the inner case being provided to cover the heater, and
a second float being plate-shaped and provided at a lower end of the inner case movably in the vertical direction, the second float having a diameter equal to an inner diameter of the inner case,
a hole through which the heater is inserted is formed in the second float, the hole having a diameter the same as a diameter of an outer shape of the heater,
gas is enclosed in a space surrounded by the inner case and the second float,
a length in the vertical direction of the inner case is smaller than a length in the vertical direction of the heater, and
when the second float is positioned at a lower end of the inner case, a gap exists between the second float and the bottom surface.

6. The filter device according to claim 1, wherein
the filter case includes a first cylindrical portion extending in the vertical direction along the filter element, and a second cylindrical portion extending in the vertical direction along the heater, a diameter of the second cylindrical portion is smaller than a diameter of the first cylindrical portion, and
the first cylindrical portion and the second cylindrical portion are connected.

7. The filter device according to claim 5, wherein,
in a plan view, the filter element and the inner case are provided adjacently,
the filter case includes a first cylindrical portion extending in the vertical direction along the filter element, and a second cylindrical portion extending in the vertical direction along the inner case,
a diameter of the second cylindrical portion is smaller than a diameter of the first cylindrical portion, and
the first cylindrical portion and the second cylindrical portion are connected.

8. The filter device according to claim 1, wherein
the filter device includes an air vent including an air vent hole formed in an upper surface of the filter case and a valve provided below the air vent hole, and
the valve includes a float floating in the liquid.

9. The filter device according to claim 1, wherein
the heater includes a pipe, and warms the liquid by an antifreeze solution that flows inside the pipe.

10. The filter device according to claim 1, wherein
the filter element includes a cover plate covering the filtration material and an upper end of the inner cylinder,
the cover plate is disposed below an upper end surface of the filter case,
the outflow portion is disposed on the upper end surface of the filter case, and
a through-hole communicating an internal space of the inner cylinder with the outflow portion is formed in the cover plate, the through-hole including a portion having a truncated cone shape including an upper side having a smaller inner diameter than an inner diameter of a lower side.

11. The filter device according to claim 10, wherein
a diameter of the cover plate is larger than a diameter of the filtration material, and
a ring having a cylindrical shape is provided below the cover plate and outside the filtration material.

12. The filter device according to claim 1, wherein
a ring having a cylindrical shape is disposed below an upper end surface of the filter case and outside the heater.

* * * * *